(12) United States Patent
Breitbart et al.

(10) Patent No.: US 12,187,193 B2
(45) Date of Patent: Jan. 7, 2025

(54) VISUAL SAFETY INDICATOR

(71) Applicant: Robert Bosch GmbH, Stuttgart (DE)

(72) Inventors: Jens Breitbart, Wildeck (DE); Stefan Kummler, Pleidelsheim (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 18/154,128

(22) Filed: Jan. 13, 2023

(65) Prior Publication Data

US 2023/0226970 A1 Jul. 20, 2023

(30) Foreign Application Priority Data

Jan. 18, 2022 (DE) .................. 10 2022 200 486.8
Sep. 9, 2022 (DE) .................. 10 2022 209 404.2

(51) Int. Cl.
*B60Q 1/50* (2006.01)
*B60W 60/00* (2020.01)

(52) U.S. Cl.
CPC .......... *B60Q 1/507* (2022.05); *B60W 60/001* (2020.02); *B60W 2554/4029* (2020.02)

(58) Field of Classification Search
CPC ............... B60Q 1/507; B60Q 2400/50; B60Q 2800/10; B60Q 1/50; B60W 60/001; B60W 2554/4029; G05B 19/0423; G05B 2219/25257
See application file for complete search history.

(56) References Cited

U.S. PATENT DOCUMENTS

| | | | |
|---|---|---|---|
| 7,540,640 B2 * | 6/2009 | Lin | B60Q 1/2696 362/543 |
| 2014/0300464 A1 * | 10/2014 | Chen | B60Q 1/323 340/471 |
| 2018/0334089 A1 * | 11/2018 | Huang | B60Q 5/006 |
| 2021/0394793 A1 * | 12/2021 | Austin | B60Q 1/5037 |
| 2022/0097524 A1 * | 3/2022 | Choi | B60K 35/00 |
| 2022/0230566 A1 * | 7/2022 | O'Brien | G09F 13/02 |

FOREIGN PATENT DOCUMENTS

| | | |
|---|---|---|
| DE | 102013217057 A1 | 3/2014 |
| DE | 112014006870 T5 | 5/2017 |
| DE | 102016007014 A1 | 12/2017 |
| DE | 102016113913 A1 | 2/2018 |

* cited by examiner

*Primary Examiner* — Daryl C Pope

(74) *Attorney, Agent, or Firm* — NORTON ROSE FULBRIGHT US LLP; Gerard A. Messina

(57) ABSTRACT

A method for operating a vehicle in an area in which pedestrians may be present. The method including at least the following steps: a) receiving at least one operating parameter of the vehicle; b) determining at least one indicator for visually displaying a present and/or future movement state of the vehicle for a pedestrian; and c) visualizing the at least one indicator in the surroundings of the vehicle.

12 Claims, 1 Drawing Sheet

VISUAL SAFETY INDICATOR

CROSS REFERENCE

The present application claims the benefit under 35 U.S.C. § 119 of German Patent Application Nos. DE 10 2022 200 486.8 filed on Jan. 18, 2022, and DE 10 2022 209 404.2 filed on Sep. 9, 2022, which are expressly incorporated herein by reference in their entireties.

FIELD

The present invention relates to a method for operating a vehicle in an area in which pedestrians may be present. Furthermore, a safety system for a vehicle is provided according to the present invention, for carrying out the method. The present invention may, in particular, be used in connection with at least semi-automated or autonomous driving.

BACKGROUND INFORMATION

A main focus in the present development strategies of the automobile and truck providers is on the provision of functions which enable a form of autonomous driving (e.g., robotaxis, delivery of goods by trucks, dispatch of products using robots or use of robots in stores, etc.). In light of the increasing number of automated products in the future, it is important to provide additional support for other persons or road users (e.g., passengers waiting at intersections or crosswalks, pedestrians, factory workers in stores, . . . ) in order to facilitate the understanding and the visualization of specific work areas of automated automobiles/robots and avoid accidents.

One important aspect for the operation of vehicles, in particular when these are configured for an at least semi-automated or autonomous driving operation, is to ensure a sufficient operational safety, in particular, in areas in which pedestrians may be present.

Proceeding from this, it is an object of the present invention to enhance the operational safety of, in particular, at least semi-automated vehicles.

SUMMARY

The object may be achieved by the features of the present invention. Advantageous specific embodiments of the present invention are disclosed herein.

A method for operating a vehicle in an area in which pedestrians may be present contributes to this. According to an example embodiment of the present invention, the method include at least the following steps:
 a) receiving at least one operating parameter of the vehicle;
 b) determining at least one indicator for visually displaying a present and/or future movement state of the vehicle for a pedestrian; and
 c) visualizing the at least one indicator in the surroundings of the vehicle.

Steps a), b), and c) may be carried out, for example, at least once and/or repeatedly in the indicated order for carrying out the method. Furthermore, steps a), b), and c), in particular, steps a) and b), may be carried out at least partially in parallel or simultaneously. The method may, for example, be carried out by a safety system for a vehicle.

The method may, in particular, contribute to enhancing the operational safety of, in particular, at least semi-automated vehicles, in particular, during an operation in the surroundings of pedestrians. The vehicle may be a motor vehicle, for example, such as an automobile. The vehicle may be configured for an at least semi-automated or autonomous driving operation. Conventional areas in which pedestrians may be present are, for example, parking lots, parking garages, roads in urban or residential areas, and the like. For example, the area here may be a parking lot or a parking garage.

According to an example embodiment of the present invention, in step a), a receiving of at least one operating parameter of the vehicle takes place. The operating parameter is usually used for describing at least one influencing variable on the present and/or future movement state of the vehicle. The operating parameter may, for example, be provided by at least one driving operation sensor of the vehicle, such as, for example, a wheel speed sensor, a velocity sensor, an acceleration sensor, a GNSS sensor, or the like. By way of example, the operating parameter may also be provided by a control unit of the vehicle which is able to carry out a trajectory planning for an at least semi-automated or autonomous driving operation. The operating parameter may be received by a safety system of the vehicle.

According to an example embodiment of the present invention, in step b), a determination of at least one indicator for visually displaying a present and/or future movement state of the vehicle for a pedestrian takes place. The movement state describes, in particular, a present and/or future (planned) driving movement of the vehicle. The movement state may, for example, depend on the velocity and/or acceleration and/or direction with which the driving movement is carried out. The indicator is, in particular, suitable for providing the pedestrian with a visual indication for assessing the present movement and/or a future movement of the vehicle.

According to an example embodiment of the present invention, in step c), a visualization of the at least one indicator in the surroundings of the vehicle takes place. The visualization is used, in particular, so that a pedestrian may visually detect or see the indicator. The visualization takes place, for example, using at least one light beam which originates from the vehicle. The at least one indicator is preferably visualized on a driving surface on which the vehicle is situated.

According to one advantageous embodiment of the present invention, it is provided that the method is carried out for the at least semi-automated driving with the vehicle. The method may preferably be carried out for the at least semi-autonomous driving with the vehicle. The method may, for example, be carried out for the provision of an automated assistance system, in particular, a pedestrian assistance system.

According to one further advantageous embodiment of the present invention, it is provided that the at least one operating parameter encompasses the driving velocity and/or the driving direction and/or the latency of the vehicle. The latency of the vehicle describes, in particular, the latency period or response time which may be expected from the vehicle and/or an at least semi-automated driving system.

According to one further advantageous embodiment of the present invention, it is provided that the at least one operating parameter encompasses a planned trajectory of the vehicle.

According to one further advantageous embodiment of the present invention, it is provided that at least one indicator displays a hazard zone. This is generally a zone which, when entered by a pedestrian, (most likely) leads or may lead to an accident, in particular, since the vehicle most likely is no longer able to stop completely.

According to one further advantageous embodiment of the present invention, it is provided that at least one indicator displays a safety area. This is generally an area in which the vehicle is advantageously able to be safely stopped, in particular, when a pedestrian enters this area.

According to one further advantageous embodiment of the present invention, it is provided that at least one indicator displays at least a portion of a planned trajectory of the vehicle.

According to one further advantageous embodiment of the present invention, it is provided that at least one display unit of the vehicle is used for the visualization, which is situated in the surroundings of the vehicle and configured for a selective illumination. For example, the display unit may include at least one headlight and/or one illuminant including light emissions which are preferably directional and/or (directionally) controllable. The display unit may, for example, include one or multiple, in particular, selectively controllable light-emitting diodes (LEDs). For example, the display unit may include multiple, in particular, selectively controllable LEDs which are arranged to form a matrix.

According to one further advantageous embodiment of the present invention, it is provided that at least one projection onto the driving surface or a selective illumination of a portion of the driving surface in the surroundings of the vehicle is carried out for the visualization. The driving surface may, for example, relate to a part of a pavement, of a parking lot surface or of a parking garage ground surface.

According to one further aspect of the present invention, a safety system for a vehicle is provided, the safety system being configured to carry out a method described here. The safety system may, for example, include a processor and/or a control unit (controller), which is able to execute commands for carrying out the method. The safety system may furthermore include the display unit, for example, or control the same.

The details, features, and advantageous embodiments described in connection with the method of the present invention may, accordingly, also occur in the safety system described here, and vice versa. In this regard, reference is made in full to the comments provided there for the more detailed characterization of the features.

The approach of the present invention presented here as well as its technical environment are described hereafter in greater detail based on the figures. It shall be noted that the present invention is not to be restricted by the shown exemplary embodiments. In particular, unless explicitly shown otherwise, it is also possible to extract partial aspects of the actual situations described in the figures and to combine these with other components and/or findings from other figures and/or the present description.

DETAILED DESCRIPTION OF EXAMPLE EMBODIMENTS

Figure 1:
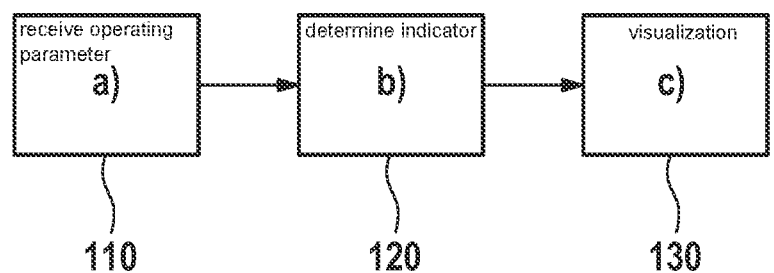
FIG. 1 shows an exemplary flowchart of a method of the present invention presented here.

FIG. 1 schematically shows an exemplary flowchart of a method of the present invention presented here. The method is used for operating a vehicle 1 in an area in which pedestrians may be present. The order of steps a), b), and c) shown with the aid of blocks 110, 120, and 130 is by way of example and may take place at least once in the shown order for carrying out the method.

In block 110, according to step a) a receiving of at least one operating parameter of vehicle 1 takes place. In block 120, according to step b) a determination of at least one indicator 2, 3, 4 for visually displaying a present and/or future movement state of vehicle 1 for a pedestrian takes place. In block 130, according to step c) a visualization of the at least one indicator 2, 3, 4 in the surroundings of vehicle 1 takes place.

Figure 2:
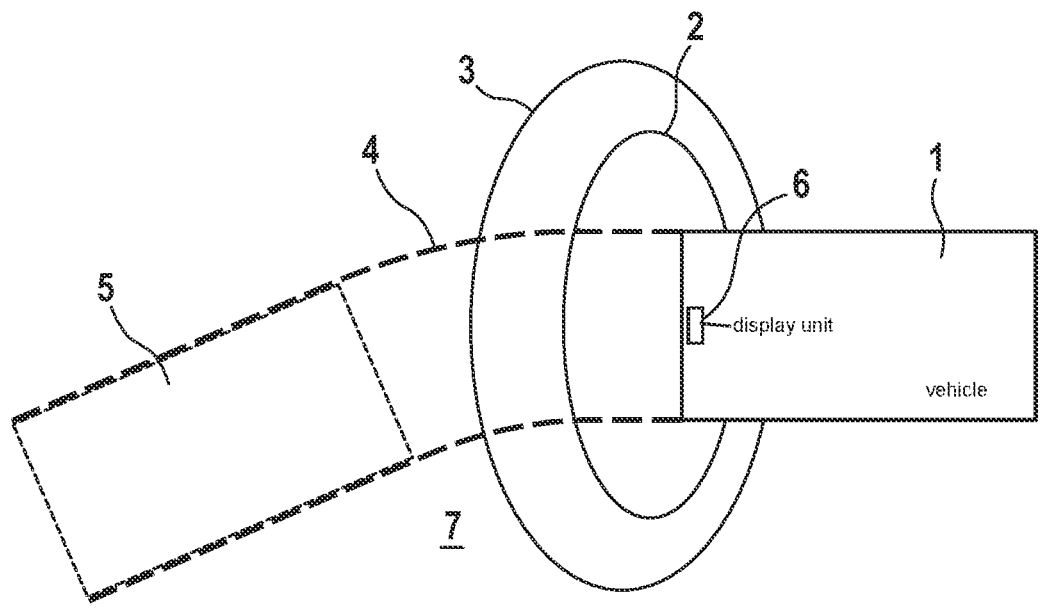
FIG. 2 shows an exemplary application of the method of the present invention presented here.

FIG. 2 schematically shows an exemplary application of the method presented here. FIG. 2, by way of example, shows the use of a safety system described here in a vehicle 1, the safety system being configured to carry out the method described here. The safety system here, by way of example, includes a display unit 6 as well as a control unit, which is not shown and configured to carry out the method described here.

The described concept focuses not only on autonomous/self-driving vehicles 1, but may also be used in other applications such as robots in a manufacturing line, transport vehicles in factories, and the like.

The method, however, may preferably be carried out for the at least semi-autonomous driving with the vehicle 1 shown here by way of example.

The method may advantageously be used in a car 1 including an automatic and driverless parking system. The car may drive in an automated manner onto an empty parking spot and possibly lock itself after the parking process has been completed. The driver may prompt vehicle 1 to drive automatically from its parking position to the entrance of the parking facility. At present, no visible display is available, so that outside persons may recognize neither the actual "operating range" nor the corresponding driving direction of the vehicle.

To prevent constant stopping of the exemplary driverless vehicle 1 and ensure the safety of the pedestrians, it may advantageously be made possible by the method, for example, to mark multiple areas 2, 3 around vehicle 1, including an area 3 in which vehicle 1 is decelerating, but most likely is not hitting anyone, and an area 2 which, when entered, would result in an accident.

This represents one example of that, and possibly how, at least one indicator 2 is able to display a hazard zone which, when entered by a pedestrian, with high probability results in an accident since vehicle 1 with high probability will no longer be able to stop completely.

Furthermore, this represents one example of that, and possibly how, at least one indicator 3 is able to display a safety area in which vehicle 1 is able to be safely stopped when a pedestrian enters this area.

For example, the first (oval) area here shows area 2 which will with high probability result in an accident since passenger car 1 with high probability is no longer able to stop completely. Second area 3 shows an area in which it is possible to safely stop vehicle 1 without injuring anyone. Entering area 3, however, may disrupt the traffic flow.

The dotted markings 4 may be used, for example, to display the calculated driving trajectory of vehicle 1 for the next few meters.

This represents one example of that, and possibly how, at least one indicator 4 is able to display at least a portion of a planned trajectory of vehicle 1.

This may further enhance the safety during the circumvention of pedestrians and helps the drivers and pedestrians to see what the driverless vehicle 1 is doing. The dotted area 5 shows, by way of example, the (planned) final position of vehicle 1 itself. It is not absolutely necessary as a projection, but serves here above all to increase the readability of the graph. A corresponding visualization of the planned end position of vehicle 1, however, may also represent a further advantageous specific embodiment of the method.

For example, at least one display unit 6 of vehicle 1 may be used for the visualization, which is situated in the surroundings of vehicle 1 and configured for a selective illumination.

One advantageous approach in this connection is the illumination around vehicle 1, e.g., by LEDs, which mark areas 2, 3 around vehicle 1 which may designate different areas 2, 3. Such areas 2, 3 may, e.g., be an area 3 which requires particular attention, or a critical area 2 in which an accident cannot be prevented due to the limitations by vehicle 1.

When such areas 2, 3 are marked, pedestrians may easily go around them without causing accidents. It should be noted that, even though it is easy to avoid a single car, it may be difficult to avoid multiple quiet electric cars.

Modern LED lighting may show different colors and/or unambiguous patterns and advantageously be used for highlighting areas 2, 3 and/or for displaying the travel path of the vehicles. The areas illuminated by LEDs may be safety lighting areas.

The areas which may be highlighted usually depend on the driving velocity, the driving direction and/or the latency period which may be expected from the automated driving system. The latter is generally known, at least as a worst-case estimation, since there are strict safety requirements with regard to the response time.

In general, there are two options for ascertaining the velocity and driving direction. It is possible to use the present velocity and direction of vehicle 1, and to calculate the areas based on these values. However, it is also possible to use the presently planned trajectory of vehicle 1, in particular, when the system which calculates the areas is integrated into the system carrying out the automated driving or is connected thereto.

This thus represents one example of that, and possibly how, the at least one operating parameter may encompass the driving velocity and/or the driving direction and/or the latency of vehicle 1.

Furthermore, one example is thus also provided here of that, and possibly how, the at least one operating parameter may encompass a planned trajectory of vehicle 1.

Furthermore advantageously, at least one projection onto driving surface 7 or a selective illumination of a portion of driving surface 7 in the surroundings of vehicle 1 may be carried out for the visualization. Driving surface 7 may, for example, be the road or a ground in a parking garage or a surface of a parking lot. LEDs, for example in the manner of at least one matrix LED headlight, may be used, for example, for the selective illumination.

Moreover, the visual pieces of information may also be utilized by other vehicles when these are equipped with cameras in order to adapt their planned route and, for example, attempt to avoid areas in which an accident cannot be avoided.

The method may advantageously contribute to enhancing the operational safety of, in particular, at least semi-automated vehicles.

What is claimed is:

1. A method for operating a vehicle, the method comprising the following steps:
   a) receiving at least one operating parameter of the vehicle, wherein the at least one operating parameter includes a response time for the vehicle to respond to presence of pedestrians;
   b) determining, based at least on the response time, a present and/or future movement state of the vehicle;
   c) determining, based on the determined movement state, one or more areas that are in surroundings of, and external to, the vehicle and that each corresponds to a respective safety status of entry by pedestrians; and
   d) operating at least one indicator, according to the determination of the one or more areas, to place in the surroundings of the vehicle at least one marker that visually demarcates, in the surroundings of the vehicle, each of the one or more areas.

2. The method as recited in claim 1, wherein the method is carried out for an at least semi-automated driving with the vehicle.

3. The method as recited in claim 1, wherein the at least one operating parameter further includes a driving velocity, and the movement state, according to which the one or more areas are determined, is determined additionally based on the driving velocity.

4. The method as recited in claim 1, wherein the at least one operating parameter further includes a planned trajectory of the vehicle, and the movement state, according to which the one or more areas are determined, is determined additionally based on the.

5. The method as recited in claim 1, further comprising operating the at least one indicator to visually demarcate in the surroundings of the vehicle at least a portion of a planned trajectory of the vehicle.

6. The method as recited in claim 1, wherein the at least one indicator is at least one display unit of the vehicle, the at least one display unit being situated and configured for a selective illumination in the surroundings of the vehicle.

7. The method as recited in claim 1, wherein the placement of the at least one marker is performed by at least one projection onto a driving surface in the surroundings of the vehicle.

8. A safety system for operating a vehicle, the safety system configured to:
   a) receive at least one operating parameter of the vehicle, wherein the at least one operating parameter includes a response time for the vehicle to respond to presence of pedestrians;
   b) determine, based at least on the response time, a present and/or future movement state of the vehicle;
   c) determine, based on the determined movement state, one or more areas that are in surroundings of, and external to, the vehicle and that each corresponds to a respective safety status of entry by pedestrians; and
   d) operate at least one indicator, according to the determination of the one or more areas, to place in the surroundings of the vehicle at least one marker that visually demarcates, in the surroundings of the vehicle, each of the one or more areas.

9. The method as recited in claim 1, wherein one of the one or more areas that is visually demarcated is a hazard zone and another of the one or more areas that is visually demarcated is a safety zone.

10. The method as recited in claim 9, wherein the hazard zone is between the vehicle and the safety zone, the visual demarcation of the hazard zone demarcates at least an exterior boundary of the hazard zone, and the visual demarcation of the safety zone demarcates at least an exterior boundary of the safety zone.

11. The method as recited in claim 1, wherein the placement of the at least one marker is performed by a selective illumination of a portion of a driving surface in the surroundings of the vehicle.

12. The method as recited in claim 1, wherein:
(i) the one or more areas that are visually demarcated include a safety zone and a hazard zone that:
   (a) extends from an interior boundary of the hazard zone to an exterior boundary of the hazard zone that is more distal from the vehicle than the interior boundary of the hazard zone; and
   (b) is arranged between the vehicle and the safety zone, with the exterior boundary of the hazard zone forming an interior boundary of the safety zone; and
(ii) the at least one marker includes at least a first marker that demarcates the exterior boundary of the hazard zone and the interior boundary of the safety zone and a second marker that demarcates an exterior boundary of the safety zone.

\* \* \* \* \*